United States Patent [19]

Oka

[11] Patent Number: 5,261,033
[45] Date of Patent: Nov. 9, 1993

[54] METHOD OF AND APPARATUS FOR CONVERTING LINE GRAPHIC INTO GRAPHIC HAVING CURVE

[75] Inventor: Hiroyuki Oka, Kyoto, Japan

[73] Assignee: Dainippon Screen Mfg. Co., Ltd., Kyoto, Japan

[21] Appl. No.: 607,279

[22] Filed: Oct. 31, 1990

[30] Foreign Application Priority Data

Oct. 11, 1989 [JP] Japan .................. 1-292926

[51] Int. Cl.⁵ .............................. G06F 15/62
[52] U.S. Cl. .................................. 395/142
[58] Field of Search ......................... 395/142

[56] References Cited

U.S. PATENT DOCUMENTS 4,686,636 8/1987 Schrieber .................. 395/142

Primary Examiner—Gary V. Harkcom
Assistant Examiner—Almis Jankus
Attorney, Agent, or Firm—Lowe, Price, LeBlanc & Becker

[57] ABSTRACT

The center line (CL) of a line graphic (A) is represented by a set of linear segments. A bent part ($P_2$-$P_9$) is specified and a train of linear segments representing the bent part remains in a process of correcting defect the line graphic. After the defect is corrected, the train of linear segments is converted into a curve to thereby obtain a graphic having a curve.

15 Claims, 7 Drawing Sheets

IDEAL
CONVENTIONAL
FIG. 7B
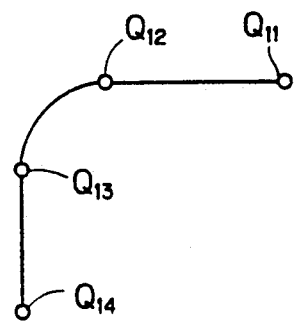
IDEAL
CONVENTIONAL
FIG. 8B
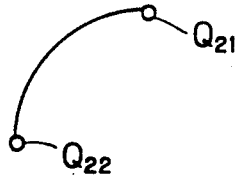

METHOD OF AND APPARATUS FOR CONVERTING LINE GRAPHIC INTO GRAPHIC HAVING CURVE

BACKGROUND OF THE INVENTION

1. Field of the Invention

The present invention relates to a method of and an apparatus for converting a line graphic into a graphic having a curve therein.

2. Description of Prior Arts

In order to enable processing of a drawing such as a design drawing for machines or electric circuits, an automatic drawing input device is used for reading the drawing and producing its graphic data. The automatic drawing input device reads the drawing with a scanner for producing graphic data of a line graphic provided on the drawing, and converts the graphic data into those of a format easily treated by a computer.

The processes performed by the automatic drawing input device include a thinning process or a core-lining process of extracting only the center line of a line graphic, a form correction process of correcting disorder of a line graphic expressed by a center line, and a curve approximation process of approximating a bent part of a line graphic with a circular arc or a spline function, for example.

However, if the aforementioned form correction process is performed in advance of the curve approximation process, a bent part to be approximated with a curve may be erroneously recognized as disorder or defects of the line graphic and subjected to erroneous correction. FIGS. 7A-7C and 8A-8C are explanatory diagrams showing such cases where line graphics are erroneously corrected by the form correction process.

FIG. 7A shows an example wherein a center line extracted from a line graphic is approximated with line segments connecting points $Q_{11}$ to $Q_{14}$, and a form correction process and a curve approximation process are successively performed on this line. The section between the points $Q_{12}$ and $Q_{13}$ should be converted into a circular arc, as shown in FIG. 7B. However, if the form correction process is performed in advance of the curve approximation process, a set of points between the points $Q_{12}$ and $Q_{13}$ in FIG. 7A may be erroneously recognized as distortion of the graphic and replaced by two points $Q_{12a}$ and $Q_{13a}$ as shown in FIG. 7C. Consequently, the section between the points $Q_{12a}$ and $Q_{12a}$ is erroneously approximated with a line segment, and no curve part is recognized.

FIG. 8A shows an example wherein a center line extracted from an arcuate line graphic is approximated with line segments connecting points between points $Q_{21}$ and $Q_{22}$. While there is a line segment extending from a point $Q_{23}$ to the arcuate line graphic, this segment is essentially unnecessary. In a form correction process, therefore, it is desirable that the point $Q_{23}$ is removed and the line graphic is approximated with a curve as shown in FIG. 8B. As the result of the form correction process, however, the point $Q_{23}$ and the adjacent line graphic points may be replaced by points $Q_{24}$ and $Q_{25}$, as shown in FIG. 8C. Consequently, the section between the points $Q_{24}$ and $Q_{25}$ is erroneously approximated with a straight line, whereas the section between the points $Q_{21}$ and $Q_{24}$ and that between the points $Q_{25}$ and $Q_{22}$ are approximated with circular arcs.

On the other hand, if the curve approximation process is performed in advance of the form correction process, data handling in the form correction process becomes complicated since the format of data expressing a straight line part is different from that of data expressing a part approximated with a curve.

SUMMARY OF THE INVENTION

The present invention is directed to a method of converting a line graphic represented by a set of linear segments into a graphic having a curve.

According to the present invention, a bent part of the line graphic bent part is represented by a first subset of the linear segments A second set of linear segments are corrected without changing any of the linear segments in the bent part, to thereby a corrected line graphic consisting of corrected line segments of the second subset and the first subset of line segments of line segments in the corrected line graphic into a curve approximating the first subset of line segments, to thereby obtain a graphic having the curve.

Preferably, the candidate identification step comprises the steps of: (a-1) identifying the first subset of linear segments among the set of linear segments according to a predetermined criterion; and (a-2) obtaining the bent part by the train of linear segments specified in the step (a-1).

According to the present invention, the bent part of the line graphic is converted into a curve after a defect in the line graphic is corrected, without changing the bent part. Therefore, the bent part remains in the form of a train of linear segments until the process of correcting the defect of the line graphic is completed. the bent part to a straight line. Furthermore, the bent part is not converted into a curve until the correction of the defect is completed, so that the correction process can be conducted without discriminating the data expressing straight lines from those expressing curves.

Accordingly, an object of the present invention is to provide a method of and an apparatus for converting a line graphic into a graphic having a curve at a high accuracy without a complicated process.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 7A-7C and 8A-8C are explanatory diagrams showing examples of conventional form correction and curve conversion processes.

DESCRIPTION OF PREFERRED EMBODIMENTS

A. Schematic Structure of Apparatus

Figure 1:
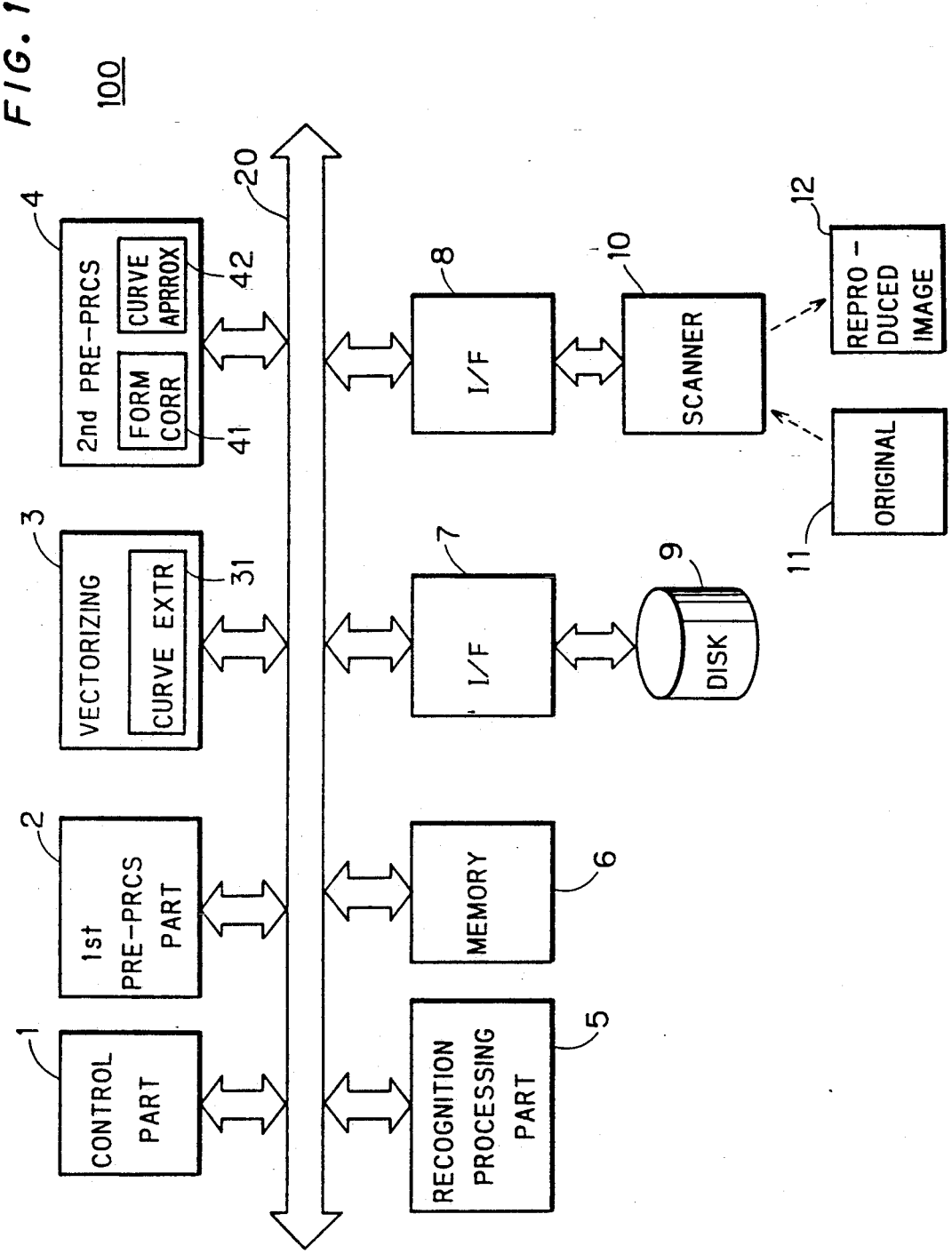
FIG. 1 is a block diagram showing the structure of an automatic drawing input device according to preferred embodiment of the present invention.

FIG. 1 is a block diagram showing an automatic drawing input device 100 according to a preferred embodiment of the present invention. This automatic drawing input device 100 comprises a control part 1, a first preprocessing part 2, a vectorizing part 3, a second preprocessing part 4, a recognition processing part 5, a memory 6, and two interfaces 7 and 8. These parts 1-8 are connected with each other through a data bus 20. Further, a disk memory 9 and an image scanner 10 are connected to the interfaces 7 and 8, respectively.

The vectorizing part 3 includes a curve candidate extraction part 31, and the second preprocessing part 4 includes a form correction part 41 and a curve approximation part 42.

B. Procedure of Embodiment

Figure 2:
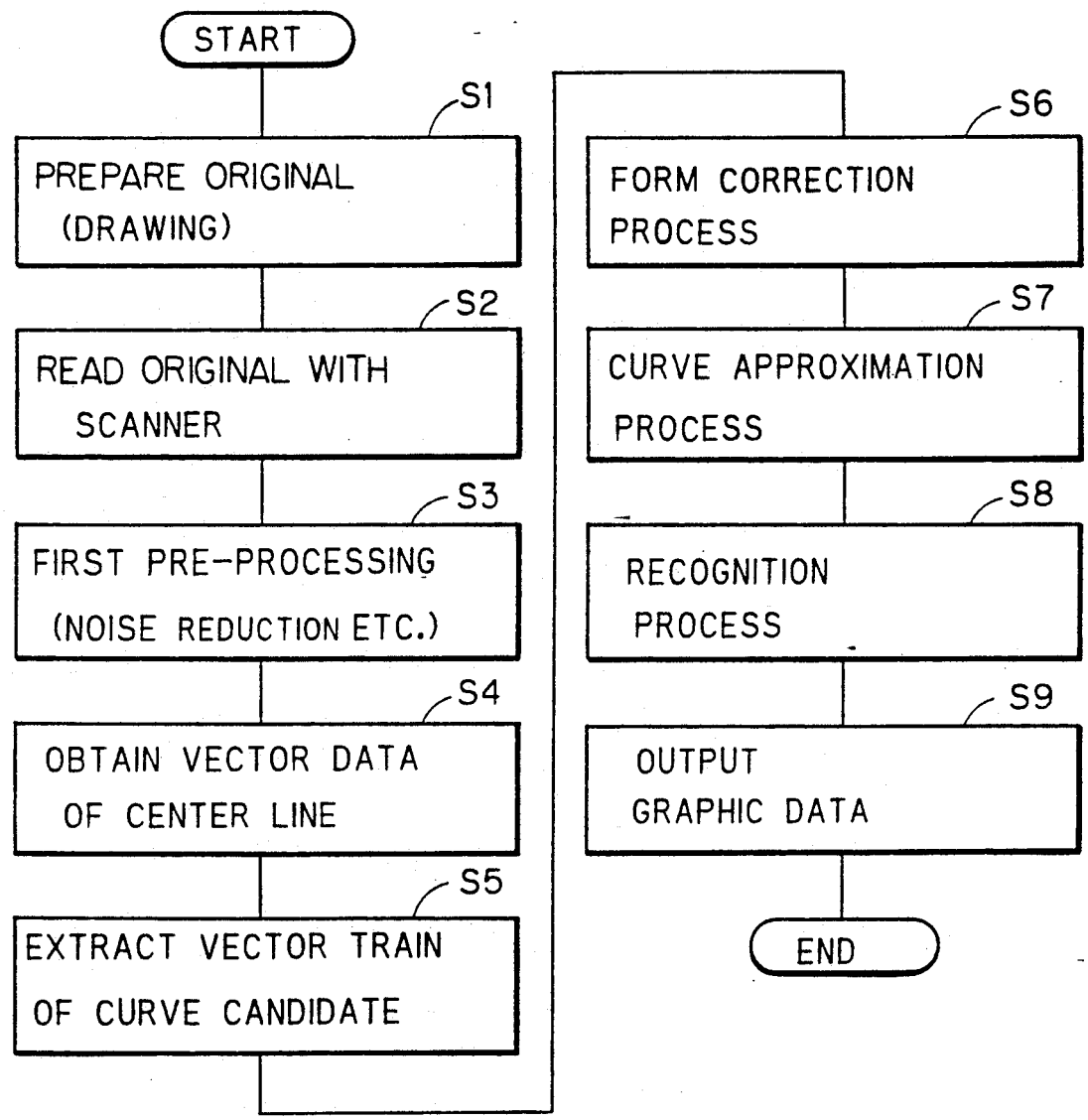
FIG. 2 is a flow chart showing the procedure of the preferred embodiment.

FIG. 2 is a flow chart showing the procedure of the preferred embodiment. FIGS. 3A-3E are conceptual diagrams showing progress of the processing of a line graphic by this procedure.

Figure 3D:
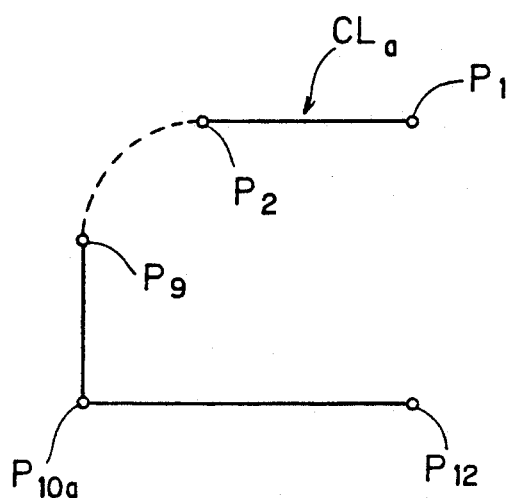
FIGS. 3A-3E are conceptual diagrams showing progress of processing of a line graphic in the preferred embodiment.
Figure 3A:
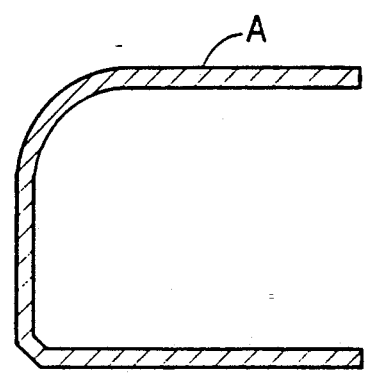

At a step S1, an original 11 (FIG. 1) on which an original line graphic is previously drawn is prepared. An example of the line graphic is illustrated in FIG. 3A as a graphic A.

At a step S2, this original 11 is read by the image scanner 10, and the obtained image data is stored in the memory 6. This image data expresses a black-and-white binary image of the line graphic by binary data for each pixel, for example.

At a step S3, the first preprocessing part 2 performs first preprocessing which includes a process of reducing noise from the image data.

Figure 3E:
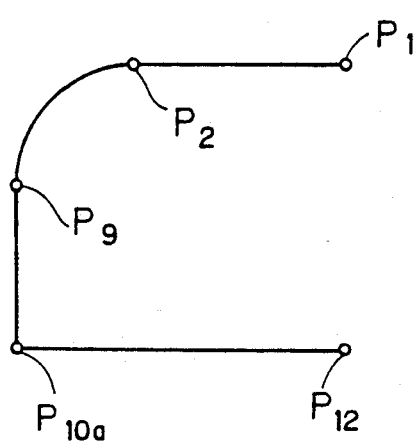
Figure 3B:
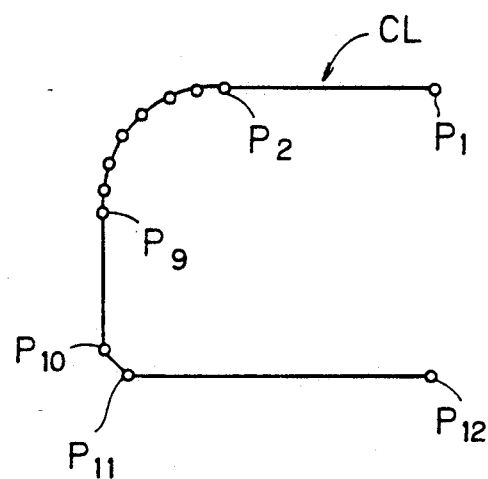
Figure 4A:
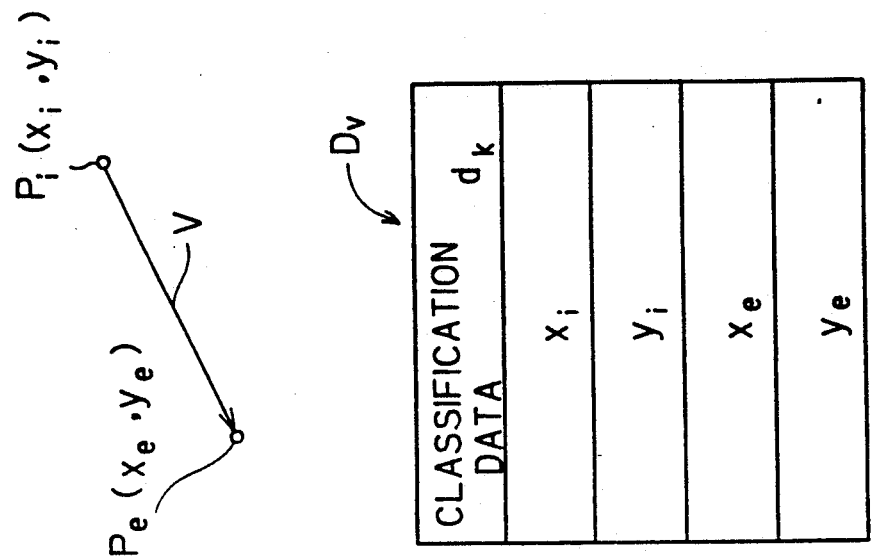
FIGS. 4A and 4B are conceptual diagrams showing structures of vector data.
Figure 4B:
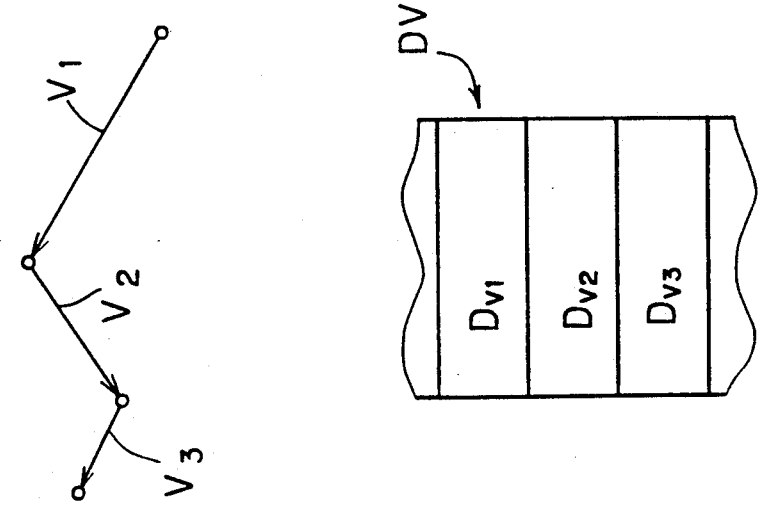

At a step S4, the vectorizing part 3 obtains vector data expressing the center line of the line graphic A on the basis of the image data after the first preprocessing. FIG. 3B shows a center line CL which is expressed by the vector data. The center line CL is expressed by a vector train successively connecting points $p_1$ to $P_{12}$. FIG. 4A illustrates the structure of vector data expressing one vector V. The vector V connects a start point $P_i$ and an end point $P_e$. The rector data $D_v$ includes classification data $d_k$ expressing the data type (vector data, curve data etc.), and data indicating coordinate values $(x_i, y_i)$ of the start point $P_i$ and coordinate values $(x_e, y_e)$ of the end point $P_e$ on an image plane. Alternatively the vector data $D_v$ may include the classification data $d_k$, data indicating the start point $P_i$, the direction of the vector V and the length of the vector V. FIG. 4B illustrates the structure of vector data DV for a plurality of vectors $V_1$ to $V_3$ which are serially connected with each other. As shown in FIG. 4B, the vector data DV expressing the connected vectors has such a structure that vector data $D_{v1}$ to $D_{v3}$ of the respective vectors $V_1$ to $V_3$ are arranged along the order of connection.

The reason why the center line CL is used for representing the line graphic A is that the data amount of the center line CL is small as compared with that of the line graphic A itself, and is convenient for data processing. In order to obtain vector data of the center line CL, the contour line or border line between a black region and a white region of the line graphic A is expressed by a closed vector chain consisting of a number of connected vectors on the basis of the aforementioned binary image data. Thereafter the so-called core-lining is performed on the closed vector chain, whereby the vector data of the center line CL can be obtained. Alternatively, it is also possible to perform thinning of the line graphic A on the basis of the binary image data for obtaining a center line CL having a width of one pixel, thereby obtaining vector data expressing this center line CL.

At a step S5, the curve candidate extraction part 31 provided in the vectorizing part 3 extracts a vector train expressing a bent part which is to be converted into a curve. Extraction of the curve candidate is performed on the basis of the following criterion, for example:

First, it is successively examined whether or not adjacent vectors $V_j$, $V_{j+1}$ (j=1, 2, ..., n−1) of a continuous vector train $V_i$ (i=1, 2, ..., n) satisfy the following two conditions (1) and (2):

$$r_1 < |V_{j+1}| / |V_j| < r_2 \quad (1)$$

$$(V_j V_{j+1}) / (|V_j| \cdot |V_{j+1}|) = \cos(\angle V_j V_{j+1}) > \theta_1 \quad (2)$$

where the angle $\angle V_j V_{j+1}$ is defined as a deviation angle from straight connection of two vectors.

The condition (1) indicates that two vectors $V_j$ and $V_{j+1}$ are regarded as curve candidates only when the ratio between lengths of the two vectors is within a predetermined range ($r_1$ to $r_2$). Therefore, if one of the two vectors $V_j$ and $V_{j+1}$ is extremely long as compared with the other, it is reasonable to regard the vectors $V_j$ and $V_{j+1}$ as portions of a straight line part rather than those of a bent part, so that the same are not extracted as curve candidates.

On the other hand, the condition (2) indicates that the two vectors $V_j$ and $V_{j+1}$ are regarded as curve candidates only when the cosine of an angle $\angle V_j V_{j+1}$ formed by the two vectors $V_j$ and $V_{j+1}$ is larger than a predetermined value $\theta_1$. Namely, the two vectors $V_j$ and $V_{j+1}$ are extracted as curve candidates only when the angle $\angle V_j V_{j+1}$ is less than a predetermined angle, while the same are not regarded as curve candidates when the angle $\angle V_j V_{j+1}$ is large.

Further, a third condition is that the number N of vectors $V_i$ forming the vector train $\{V_i\}$ satisfying both of the aforementioned conditions (1) and (2) is equal to or larger than a prescribed number $m_1$:

$$m_1 \leq N \quad (3)$$

This is because the vectors $V_i$ are probably not true curve parts but may be parts of distortion of the line graphic if the number N of the vector trains $\{V_i\}$ is smaller than $m_1$.

The constants employed in the conditions (1) to (3) may be semi-empirically decided, an example thereof is $r_1 = 0.9$, $r_2 = 1.1$, $\theta_1 = 0.90631$ (corresponding to an angle 25°), and $m_1 = 3$.

Figure 3C:
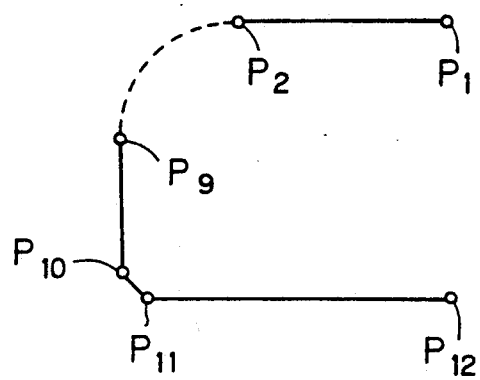

FIG. 3C schematically illustrates a part of a vector train thus extracted as a curve candidate by a broken line. Comparing FIG. 3C with FIG. 3B, it is understood that a vector train successively connecting the points $P_2$ and $P_9$ is extracted as a curve candidate. As to each vector regarded as a curve candidate, the classification data $d_k$ (see FIG. 4A) in the vector data $D_v$ is changed to a value indicating that it is a curve candidate vector. If the classification data $d_k$ is thus changed to distinguish the vector data of the curve candidate vectors from other vector data, the curve candidate can be advantageously indentified without changing the structure of the vector data. Further, since the vector data of the curve candidate vectors and other vector data are entirely identical in structure to each other, the vectorizing part 3, the second preprocessing part 4 for performing subsequent processing and the like can be also advantageously simplified in structure.

Figure 5A:
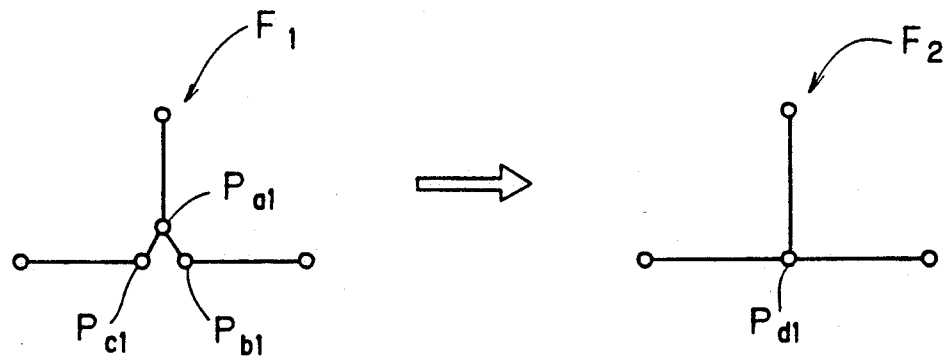
FIGS. 5A to 5C are explanatory diagrams showing examples of a form correction process.
Figure 5B:
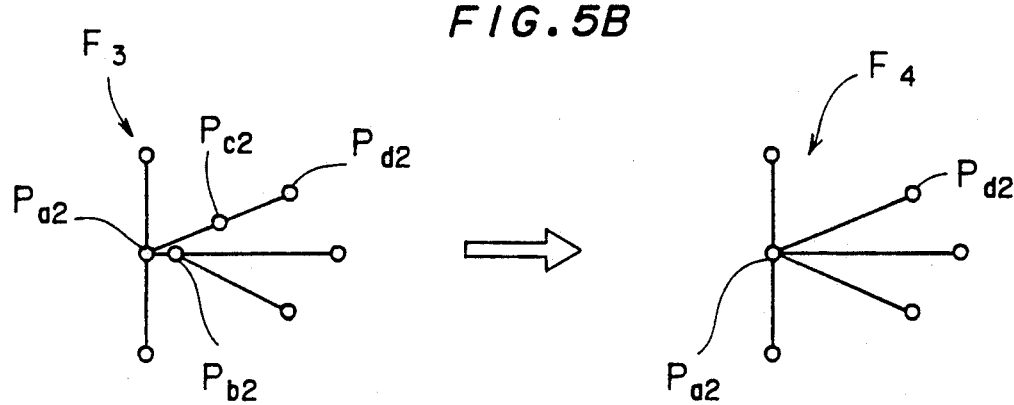

At a step S6, the form correction part 41 provided in the second preprocessing part 4 performs the form correction process for the graphic on the basis of the vector data in which the curve candidate vectors have been specified. The form correction process for the graphic includes the following "shaping process", "skip correction process" and the like to correct various image defects in the image data expressing the line graphic A:

The shaping process is adapted to automatically correct distortion caused in an intersection or angular part of a line graphic. FIGS. 5A and 5B are conceptual diagrams showing such cases where distorted parts of line graphics are removed by the shaping process. In the example shown in FIG. 5A, three points $P_{a1}$, $P_{b1}$ and $P_{c1}$ approaching each other in a line graphic $F_1$ are replaced by one branch point $P_{d1}$ in a corrected line graphic $F_2$. The corrected line graphic $F_2$ is such a graphic that two straight lines orthogonally intersect at the point $P_{d1}$.

In the example shown in FIG. 5B, two branch points $P_{a2}$ and $P_{b2}$ of a line graphic $F_3$ are combined into one branch point $P_{a2}$ in a corrected line graphic $F_4$. The corrected line graphic $F_4$ has such a form that lines radially extend from the branch point $P_{a2}$. A point $P_{c2}$ is also removed since the point $P_{c2}$ has been positioned on the straight line connecting $P_{a2}$ and $P_{d2}$ in the line graphic $F_3$.

Figure 8A:
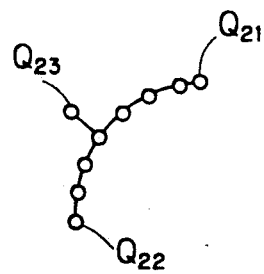
Figure 8A:
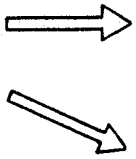
Figure 8C:
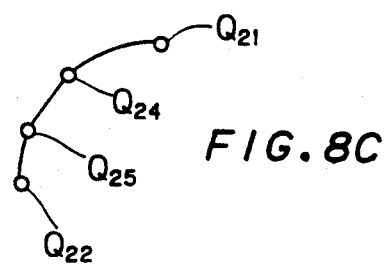

The form correction process further includes a process of correcting distortion at a turning point (point at which a straight line turns from one direction to another direction), a process of correcting palp distortion (projecting part as shown in FIG. 8A), in addition to the aforementioned correction process for distortion of a branch point or an intersection point. The detail of the form correction process is disclosed in Japanese Patent Publication Gazette No. 63-31822 (1988) and Japanese Patent Laying-Open Gazette No. 63-103384 (1988), for example.

Figure 5C:
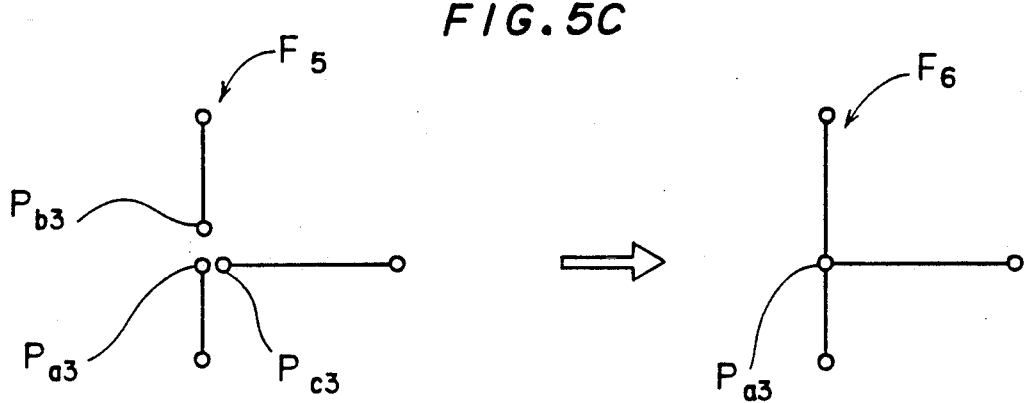

A blur correction process is adapted to automatically correct breaks in the line graphic which are caused by a faint or blurred original image on the original 11 and appear in the image data as the result of reading by the scanner 10 or the vectorizing process. FIG. 5C is a conceptual diagram showing such a case that blur of a line graphic is corrected by the blur correction process. In this example, three points $P_{a3}$, $P_{b3}$ and $P_{c3}$, which must essentially be positioned at one branch point, are separated and cut off from each other in a line graphic $F_5$. When the blur correction process is performed, the three points $P_{a3}$, $P_{b3}$ and $P_{c3}$ are replaced by one branch point $P_{a3}$ in a processed line graphic $F_6$. The detail of the blur correction process is disclosed in Japanese Patent Publication Gazette No. 63-13178 (1988) as "connection process", for example.

At the step S6, an element classification process or a feature point extraction process may be performed in addition to the form correction process. The element classification process is a process of classifying a graphic expressed by vector data into a character or letter element, a graphic element and the like. The feature point extraction process is a process of extracting feature points such as a terminal point (start point or end point of a continuous line), a turning point, an intersection point and the like from points of a graphic expressed by vector data.

In the form correction process at the step S6, the vector train extracted as a curve candidate is excluded from the objects of the form correction. FIG. 3D shows a center line $CL_a$ subjected to the form correction process. The points $P_{10}$ and $P_{11}$ in FIG. 3C are replaced by one turning point $P_{10a}$ as the result of the form correction process. The vector train between the points $P_2$ and $P_9$ is drawn by a broken line since the same is preserved as it is as a curve candidate.

Figure 6A:
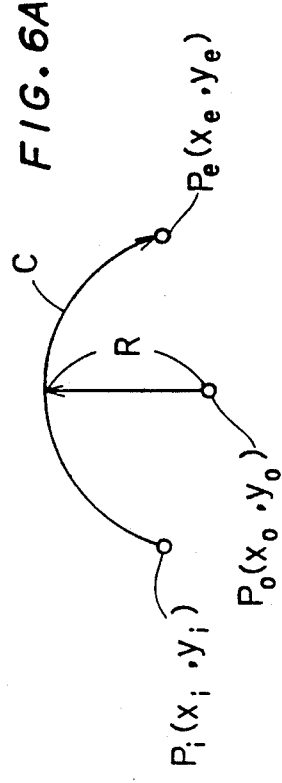
FIG. 6A is a conceptual diagram showing the structure of curve data.
Figure 6A:
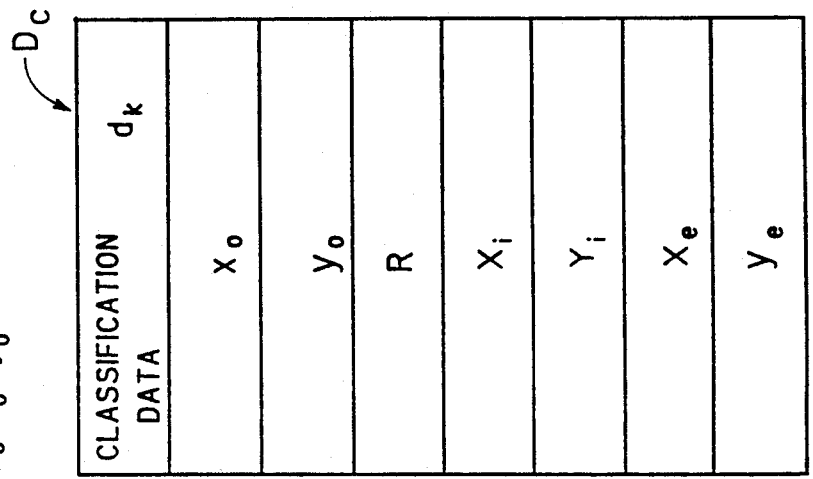

At a step S7, the curve approximation part 42 provided in the second preprocessing part 4 performs a curve approximation process for the vector train part regarded as a curve candidate. FIG. 3E shows such a state that the vector train between the points $P_2$ and $P_9$ is converted into a circular arc approximating the vector train. The conversion into a circular arc is attained by rewriting the vector data for the bent part to "curve data" having a structure shown in FIG. 6A, for example. This curve data $D_c$ is formed by classification data $d_k$ indicating that it is a circular arc, and data indicating coordinate values $(x_O, Y_O)$ of the center $P_O$ of the circular arc, a radius R, coordinate values $(x_1, y_1)$ of the start point $P_i$ of the circular arc and coordinate values $(x_e, Y_e)$ of the end point $P_e$. In general, the cove data $D_c$ represents curves approximating bent parts extracted as curve candidates.

Figure 6B:
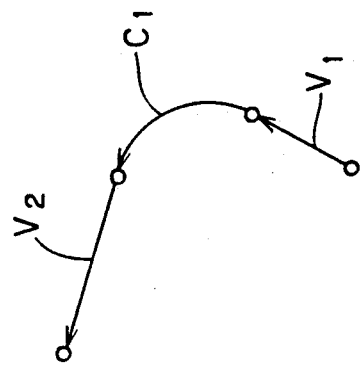
FIG. 6B is a conceptual diagram showing the structure of graphic data including curve data and vector data.
Figure 6B:
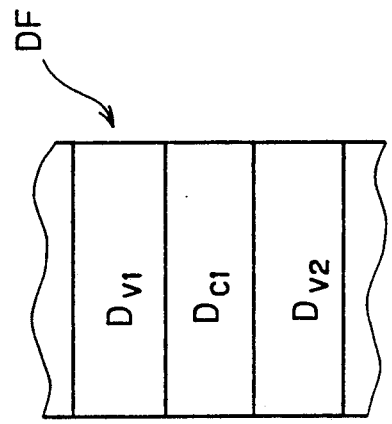
Figure 7A:
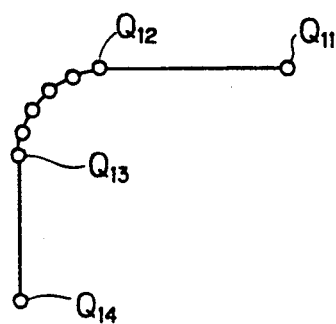
Figure 7A:
Figure 7C:
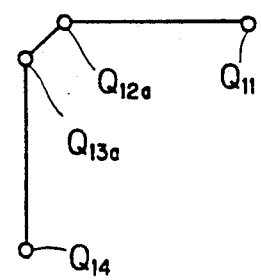

FIG. 6B is a conceptual diagram showing a data structure of graphic data in such case that a section between vectors $V_1$ and $V_2$ is converted into a curve $C_1$ as the result of curve approximation. As shown in FIG. 6B, the graphic data DF has such a structure that vector data $D_{v1}$ of the vector $V_1$, curve data $D_{c1}$ of the curve $C_1$ and vector data $D_{v2}$ of the vector $V_2$ are arranged in order.

The conversion into curves is not restricted to a circular arc but may be performed using a prescribed polynominal or spline function.

The graphic data obtained by curve approximation is transmitted to the recognition processing part 5 at a step S8, and subjected to a prescribed recognition process. The recognition process includes the so-called graphic recognition, character recognition, symbol recognition etc. As the result of the recognition process, the graphic data is arranged and converted to a form suitable for processings by a computer. This graphic data is temporarily stored in the memory 6.

At a step S9, the graphic data thus finally obtained is read from the memory 6 and supplied to an output part of the scanner 10, to obtain a reproduced image 12 of the drawing. In place of reproducing the drawing by the scanner 10, another prescribed process may be performed by outputting the graphic data to an external computer or the like.

C. Modifications (1) Although the line graphic is expressed by vector trains in the above-described embodiment, the same is not restricted to the vector trains but may be expressed by a plurality of continuous line segments.

(2) The form correction process is not restricted to the shaping process and the blur correction process, but may be a process of correcting disorder of the form of a line graphic.

(3) According to the aforementioned embodiment, extraction of a curve candidate is automatically performed along prescribed judgement conditions. Alternatively, an operator may arbitrarily designate a curve candidate. In this case, a line graphic (see FIG. 3B) expressed by a plurality of line segments, for example, may be displayed on a display means such as a CRT, so that the operator designates a series of line segments or endpoints on both ends thereof to be regarded as a curve candidate using a mouse or the like.

D. Conclusion

According to the present invention, as hereinabove described, the form correction process is performed as to the line segments excluding the curve candidate line segment, whereby line segments to be converted into curves are not erroneously corrected by the form correction process. Consequently, both of the form correction process and the approximation process can be easily and properly performed.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of converting a portion of a line graphic into a curve, said line graphic being represented by a set of linear segments, said method comprising the steps of:
   (a) identifying a portion of said line graphic as a candidate for curve conversion, said candidate for curve conversion being represented by a first subset of the set of linear segments which represent said line graphic, wherein the step (a) comprises the steps of:
   (a-1) identifying said first subset of linear segments among said set of linear segments according to a predetermined criterion; and
   (a-2) obtaining said candidate for curve conversion by classifying said first subset of linear segments in the step (a-1) as segments representing a curve;
   (b) modifying a second subset of the set of linear segments which represent said line graphic to correct an image defect in said line graphic, said second subset including no linear segment included within said first subset, to thereby obtain a corrected line graphic consisting of corrected linear segments of said second subset and said first subset of the set of linear segments which represent said line graphic; and
   (c) processing said first subset of the set of linear segments which represent said line graphic to convert the portion of said line graphic identified as a candidate for curve conversion into a curve approximating said first subset of the set of linear segments which represent said line graphic.

2. The method of claim 1, wherein the step (a-1) comprises the step of:
   (a-1-1) selecting two segments for inclusion in said first subset of linear segments under a first condition that the two segments are connected to each other and a ratio of the lengths of the two segments is between two predetermined values.

3. The method of claim 2, wherein the step (a-1) further comprises the step of:
   (a-1-2) selecting the two segments under a second condition that an angle between said two segments which is defined as a deviation from straight connection of the two segments is less than a predetermined angle.

4. The method of claim 3, wherein the step (a-1) further comprises the step of:
   (a-1-3) selecting said first subset of linear segments under a third condition that a number of linear segments included in said first subset of linear segments is larger than a predetermined number.

5. The method of claim 4, wherein
   said predetermined two values are substantially 0.9 and 1.1, respectively;
   said predetermined angle is substantially 25°; and
   said predetermined number of 3.

6. A method of converting a portion of a line graphic into a curve, said line graphic being represented by a set of linear segments, said method comprising the steps of:
   (a) identifying a portion of said line graphic as a candidate for curve conversion, said candidate for curve conversion being represented by a first subset of the set of linear segments which represent said line graphic;
   (b) modifying a second subset of the set of linear segments which represent said line graphic to correct an image defect in said line graphic, said second subset including no linear segment included within said first subset, to thereby obtain a corrected line graphic consisting of corrected linear segments of said second subset and said first subset of the set of linear segments which represent said line graphic; and
   (c) processing said first subset of the set of linear segments which represent said line graphic to convert the portion of said line graphic identified as a candidate for curve conversion into a curve approximating said first subset of the set of linear segments which represent said line graphic, wherein
   each linear segment belonging to said set of linear segments is represented by a vector data including:
   a first data having a first value indicating that said each linear segment is a straight line; and
   a second data indicating a position of said each linear segment on an image plane;
   the step (a) comprising the step of:
   (a-2) with respect to each linear segment belonging to said first subset, changing said first value to a second value indicating representation of a curve; and
   the step (b) comprising the step of:
   (b-1) modifying linear segments for which the first data has said first value without modifying linear segments for which the first data has said second value.

7. The method of claim 6, wherein the step (c) comprises the step of:
   with respect to linear segments for which the first data has said second value, converting the vector data to a curve data.

8. A method of converting a portion of a line graphic into a curve, said line graphic being represented by a set of linear segments, said method comprising the steps of:
   (a) identifying a portion of said line graphic as a candidate for curve conversion, said candidate for curve conversion being represented by a first subset of the set of linear segments which represent said line graphic;
   (b) modifying a second subset of the set of linear segments which represent said line graphic to correct an image defect in said line graphic, said second subset including no linear segment included within said first subset, to thereby obtain a corrected line graphic consisting of corrected linear segments of said second subset and said first subset of the set of linear segments which represent said line graphic, wherein the step (b) comprises the steps of selecting first and second linear segments which are not connected to each other directly in said set of linear segments; and uniting a terminal point of said first linear segment with a terminal point of said second linear segment to thereby connect said first and second linear segments to each other directly; and (c) processing said first subset of the set of linear segments which represent said line graphic to convert the portion of said line graphic identified as a candidate for curve conversion into a curve approximating said first subset of the set of linear segments which represent said line graphic.

9. An apparatus for converting a portion of a line graphic into a curve, said line graphic being represented by a set of linear segments, said apparatus comprising:

(a) means for correcting an image defect in said line graphic by correcting selected linear segments without changing any segments contained within a subset of linear segments included in said set of linear segments which represent a portion of said line graphic which is a candidate for curve conversion, to thereby obtain a corrected line graphic consisting of corrected linear segments and said subset of linear segments;

(b) means for converting said subset of linear segments in said corrected line graphic into a curve; and (c) means for inspecting respective linear segments belonging to said set of linear segments according to a predetermined criterion to automatically identify segments as members of the first subset.

10. The apparatus of claim 9, wherein said means (c) comprises:

(c-1) means for selecting two segments for inclusion in said subset of linear segments under a first condition that the two segments are connected to each other and a ratio of the lengths of the two segments is between two predetermined values.

11. The apparatus of claim 10, wherein said means (c) further comprises:

(c-2) means for selecting the two segments under a second condition that an angle between said segments which is defined as a deviation from straight connection of the two segments is less than a predetermined angle.

12. The apparatus for claim 11, wherein said means (c) further comprises:

(c-3) means for selecting said subset of linear segments under a third condition that a number of linear segments included in said subset of linear segments is larger than a predetermined number.

13. The apparatus of claim 9, further comprising:

(c) memory means for storing vector data representing each linear segment belonging to said set of linear segments, wherein said vector data includes:

a first data having a first value indicating that said each linear segment is a straight line; and a second data indicating a position of said each linear segment on an image plane;

said means (c) comprising:

means for changing said first value to a second value for each first data representing a linear segment belonging to said first subset; and said means (a) comprising:

means for modifying linear segments corresponding to first data of said first value without modifying linear segments corresponding to first data of said second value.

14. The apparatus of claim 13, wherein said means (b) comprises:

means for converting the vector data to a curve data for linear segments for which the first data has said second value.

15. An apparatus for converting a portion of a line graphic into a curve, said line graphic being represented by a set of linear segments, said apparatus comprising:

(a) means for correcting an image defect in said line graphic by correcting selected linear segments without changing any segments contained within a subset of linear segments included in said set of linear segments which represent a portion of said line graphic which is a candidate for curve conversion, to thereby obtain a corrected line graphic consisting of corrected linear segments and said subset of linear segments, wherein said means for correcting comprises means for selecting first and second linear segments which are not connected to each other directly in said set of linear segments and for uniting a terminal point of said first linear segment with a terminal point of said second linear segment to thereby connect said first and second linear segments to each other directly; and (b) means for converting said subset of linear segments in said corrected line graphic into a curve.

* * * * *